United States Patent
Sun et al.

(10) Patent No.: US 11,617,161 B2
(45) Date of Patent: Mar. 28, 2023

(54) RANDOMIZED SEARCH SPACE FOR DOWNLINK CONTROL CHANNEL

(71) Applicant: QUALCOMM Incorporated, San Diego, CA (US)

(72) Inventors: Jing Sun, San Diego, CA (US); Heechoon Lee, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 17/097,808

(22) Filed: Nov. 13, 2020

(65) Prior Publication Data

US 2021/0068080 A1    Mar. 4, 2021

Related U.S. Application Data

(63) Continuation of application No. 16/110,343, filed on Aug. 23, 2018, now Pat. No. 10,856,263.

(Continued)

(51) Int. Cl.
  *H04W 72/02*   (2009.01)
  *H04L 5/00*    (2006.01)
  *H04W 72/04*   (2009.01)

(52) U.S. Cl.
  CPC ........... *H04W 72/02* (2013.01); *H04L 5/0053* (2013.01); *H04W 72/042* (2013.01); *H04L 5/0007* (2013.01)

(58) Field of Classification Search
  CPC ............... H04W 72/02; H04W 72/042; H04W 72/0406; H04W 72/04; H04W 72/12;
  (Continued)

(56) References Cited

U.S. PATENT DOCUMENTS 8,989,121 B2 *  3/2015  Luo ............... H04W 72/042
                                              370/329
10,856,263 B2  12/2020  Sun et al.
(Continued)

FOREIGN PATENT DOCUMENTS

| CN | 106850171 A | 6/2017 |
| RU | 2574072 C1 | 2/2016 |
| WO | 2013066935 A1 | 5/2013 |

OTHER PUBLICATIONS

Intel Corporation: "PDCCH Search Spaces and Monitoring," 3GPP Draft; R1-1712569 Search Space Design, 3rd Generation Partnership Project (3GPP), Mobile Competence Centre; 650, Route Des Lucioles; F-06921, Sophia-Antipolis Cedex; France, vol. RAN WG1, No. Prague, P.R. Czechia; Aug. 21, 2017-Aug. 25, 2017, Aug. 20, 2017, XP051315385, 11 pages, Retrieved from the Internet: URL: http://www.3gpp.org/ftp/Meetings_3GPP_SYNC/RAN1/Docs/ [retrieved on Aug. 20, 2017].

(Continued)

*Primary Examiner* — Jenee Holland
(74) *Attorney, Agent, or Firm* — Qualcomm Incorporated

(57) ABSTRACT

In order to improve the selection of search space candidates for a downlink control channel, an apparatus determines a set of decoding candidates of a lower aggregation level for a downlink control channel based on a random selection from a plurality of potential decoding candidates, wherein the plurality of potential decoding candidates are defined from a second set of decoding candidates of a higher aggregation level. The apparatus then attempts to decode the downlink control channel based on determined sets of decoding candidates of different aggregation levels. The downlink control channel may comprise a PDCCH.

30 Claims, 13 Drawing Sheets

Related U.S. Application Data

(60) Provisional application No. 62/556,245, filed on Sep. 8, 2017.

(58) Field of Classification Search
CPC .... H04W 16/00; H04W 36/06; H04L 5/0053; H04L 5/0007; H04L 5/0005; H04L 5/0003; H04L 5/00; H04L 5/0055; H04L 5/0057; H04L 1/0001; H04B 7/024
See application file for complete search history.

(56) References Cited

U.S. PATENT DOCUMENTS

| | | | |
|---|---|---|---|
| 2009/0154607 A1 | 6/2009 | Lindoff et al. | |
| 2009/0209247 A1 | 8/2009 | Lee et al. | |
| 2009/0257449 A1 | 10/2009 | Chen et al. | |
| 2010/0027456 A1 | 2/2010 | Onggosanusi et al. | |
| 2010/0246721 A1 | 9/2010 | Chen et al. | |
| 2011/0110316 A1 | 5/2011 | Chen et al. | |
| 2011/0116428 A1* | 5/2011 | Seong | H04W 28/06 370/329 |
| 2011/0128933 A1 | 6/2011 | Chen et al. | |
| 2011/0222629 A1* | 9/2011 | Lindh | H04B 7/0689 375/296 |
| 2012/0039283 A1 | 2/2012 | Chen et al. | |
| 2012/0250642 A1 | 10/2012 | Qu et al. | |
| 2013/0107822 A1 | 5/2013 | Papasakellariou et al. | |
| 2013/0114529 A1 | 5/2013 | Chen et al. | |
| 2013/0114563 A1 | 5/2013 | Oizumi et al. | |
| 2014/0036858 A1 | 2/2014 | Shimezawa et al. | |
| 2014/0056279 A1* | 2/2014 | Chen | H04L 45/245 370/329 |
| 2014/0092821 A1* | 4/2014 | Zhu | H04L 5/0055 370/329 |
| 2014/0092822 A1 | 4/2014 | Koorapaty et al. | |
| 2014/0092836 A1 | 4/2014 | Park et al. | |
| 2014/0126487 A1* | 5/2014 | Chen | H04W 76/19 370/329 |
| 2014/0126490 A1* | 5/2014 | Chen | H04W 72/042 370/328 |
| 2014/0169322 A1* | 6/2014 | Ouchi | H04W 52/146 370/329 |
| 2014/0185541 A1* | 7/2014 | Gaal | H04L 5/0053 370/329 |
| 2014/0198720 A1 | 7/2014 | Gaal et al. | |
| 2014/0369437 A1 | 12/2014 | Horiuchi et al. | |
| 2015/0043465 A1* | 2/2015 | Ouchi | H04W 72/12 370/329 |
| 2015/0181577 A1 | 6/2015 | Moulsley | |
| 2015/0201405 A1 | 7/2015 | Liu et al. | |
| 2015/0208392 A1* | 7/2015 | Park | H04W 72/042 370/329 |
| 2015/0244510 A1* | 8/2015 | Chae | H04L 1/1825 370/329 |
| 2015/0282208 A1* | 10/2015 | Yi | H04W 72/042 370/329 |
| 2015/0327227 A1* | 11/2015 | Soldati | H04W 72/042 370/330 |
| 2015/0358105 A1* | 12/2015 | Jung | H04L 5/0023 370/329 |
| 2016/0021658 A1* | 1/2016 | Chen | H04L 5/0053 370/252 |
| 2016/0150532 A1* | 5/2016 | Bhushan | H04L 1/1887 370/336 |
| 2016/0227541 A1* | 8/2016 | Damnjanovic | H04W 72/0453 |
| 2017/0005770 A1* | 1/2017 | Shimezawa | H04L 1/0027 |
| 2017/0026942 A1* | 1/2017 | Vajapeyam | H04W 72/04 |
| 2017/0034850 A1* | 2/2017 | Rico Alvarino | H04L 1/1822 |
| 2018/0098307 A1* | 4/2018 | Yang | H04W 76/27 |
| 2018/0199350 A1* | 7/2018 | John Wilson | H04L 1/0057 |
| 2020/0367211 A1* | 11/2020 | Moulsley | H04W 72/042 |

OTHER PUBLICATIONS

International Search Report and Written Opinion—PCT/US2018/047934—ISA/EPO—dated Nov. 30, 2018.

LG Electronics: "Discussion on Hierarchical Search Space Structure," 3GPP Draft; R1-1713167 Discussion on Hierarchical Search Space Structure, 3rd Generation Partnership Project (3GPP), Mobile Competence Centre; 650, Route Des Lucioles; F-06921 Sophia-Antipolis Cedex, vol. RAN WG1, No. Prague, Czech Republic; Aug. 21, 2017-Aug. 25, 2017, Aug. 20, 2017, XP051315976, 10 pages, Retrieved from the Internet: URL: http://www.3gpp.org/ftp/Meetings_3GPP_SYNC/RAN/Docs/[retrieved on Aug. 20, 2017].

Nokia, et al: "On the Search Space Design and UE Blind Detection," 3GPP Draft; R1-1714060_SEARCHSPACEDESIGN_FINAL, 3rd Generation Partnership Project (3GPP), Mobile Competence Centre; 650, Route Des Lucioles; France, vol. RAN WG1, No. Prague, Czech Republic; Aug. 21, 2017-Aug. 25, 2017, Aug. 20, 2017, XP051316852, 4 pages, Retrieved from the Internet: URL: http://www.3gpp.org/ftp/Meetings_3GPP_SYNC/RAN1/Docs/ [retrieved on Aug. 20, 2017].

* cited by examiner

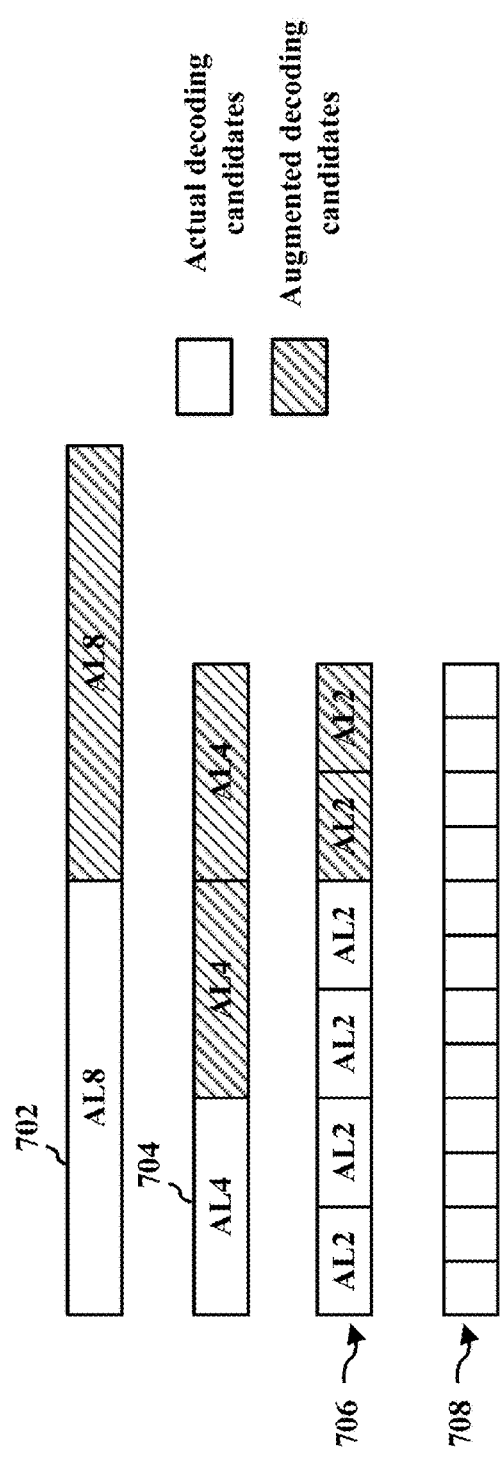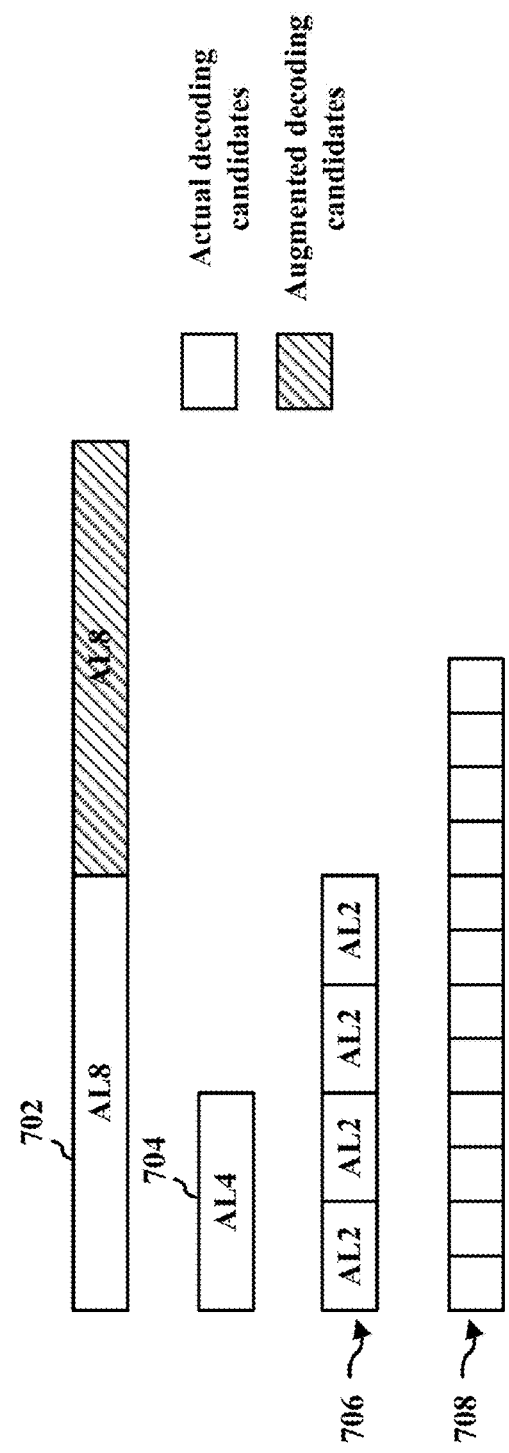
FIG. 7A
FIG. 7B

RANDOMIZED SEARCH SPACE FOR DOWNLINK CONTROL CHANNEL

CROSS-REFERENCE TO RELATED APPLICATION

This application is continuation of U.S. Non-Provisional application Ser. No. 16/110,343, entitled "RANDOMIZED SEARCH SPACE FOR DOWNLINK CONTROL CHANNEL" and filed on Aug. 23, 2018, and claims the benefit of U.S. Provisional Application Ser. No. 62/556,245, entitled "RANDOMIZED SEARCH SPACE FOR DOWNLINK CONTROL CHANNEL" and filed on Sep. 8, 2017, each of which is expressly incorporated by reference herein in its entirety.

BACKGROUND

Technical Field

The present disclosure relates generally to communication systems, and more particularly, to a control channel search space.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Control signaling may be used to support the transmission of downlink and uplink data channels. For example, control signaling may enable a UE to successfully receive, demodulate, and decode a data channel. For example, Downlink Control Information (DCI) may be transmitted through a downlink control channel, e.g., a Physical Downlink Control Channel (PDCCH), and may include information about allocation for data communication, format information, information related to HARQ, etc.

A UE might not be informed of the Control Channel Elements (CCEs) used for the downlink control channel and/or an aggregation level used by the base station. Therefore, the UE may need to find the downlink control channel by monitoring a set of downlink control channel candidates, which may be referred to as blind decoding. The monitored set of candidates may correspond to a control channel search space determined by the UE. There is a need for the UE to determine a search space to attempt to receive a downlink control channel.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As a UE may be unaware of the CCEs used by a base station to transmit a downlink control channel, such as PDCCH, the UE may need to monitor a set of candidates that may potentially contain a downlink control channel. The monitored set of candidates may correspond to a PDCCH search space determined by the UE. Aspects presented herein address the need for the UE to determine a search space to attempt to receive a downlink control channel.

In an aspect of the disclosure, a method, a computer-readable medium, and an apparatus are provided. The apparatus determines a set of decoding candidates of a lower aggregation level for a downlink control channel based on a random selection from a plurality of potential decoding candidates, wherein the plurality of potential decoding candidates are defined from a second set of decoding candidates of a higher aggregation level. The higher aggregation level may comprise a highest aggregation level. The apparatus then attempts to decode the downlink control channel based on determined sets of decoding candidates of different aggregation levels. The downlink control channel may comprise a PDCCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 7A and 7B illustrate examples of augmented decoding candidates.

DETAILED DESCRIPTION

Figure 1:
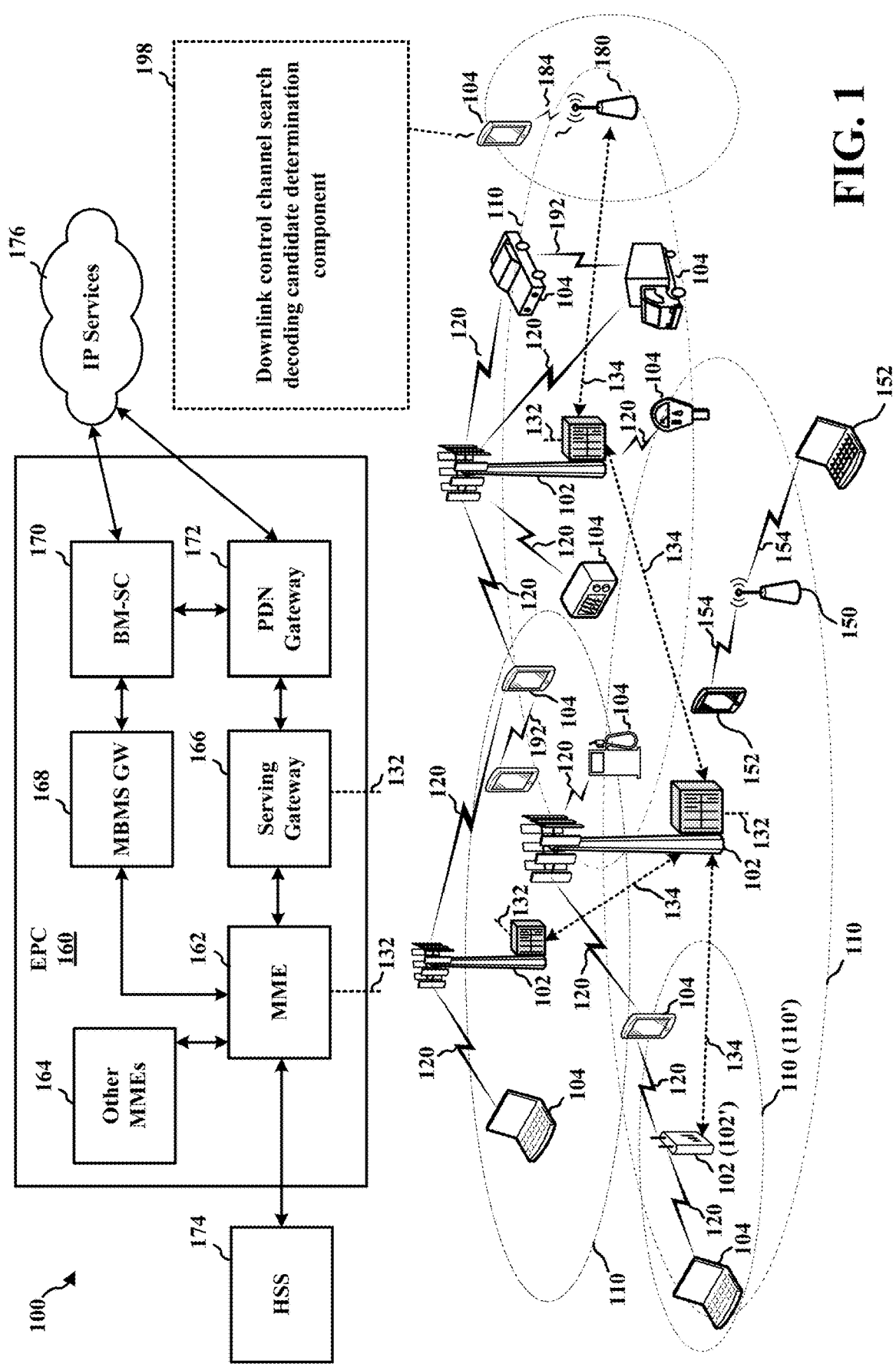
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to comprise a downlink channel decoding candidate determination component (198) that determines a set of decoding candidates for a certain aggregation level, e.g., which may also be referred to as a search space for that aggregation level, for a downlink control channel (e.g., PDCCH) as described in connection with any of FIGS. 4-10.

Figure 2:
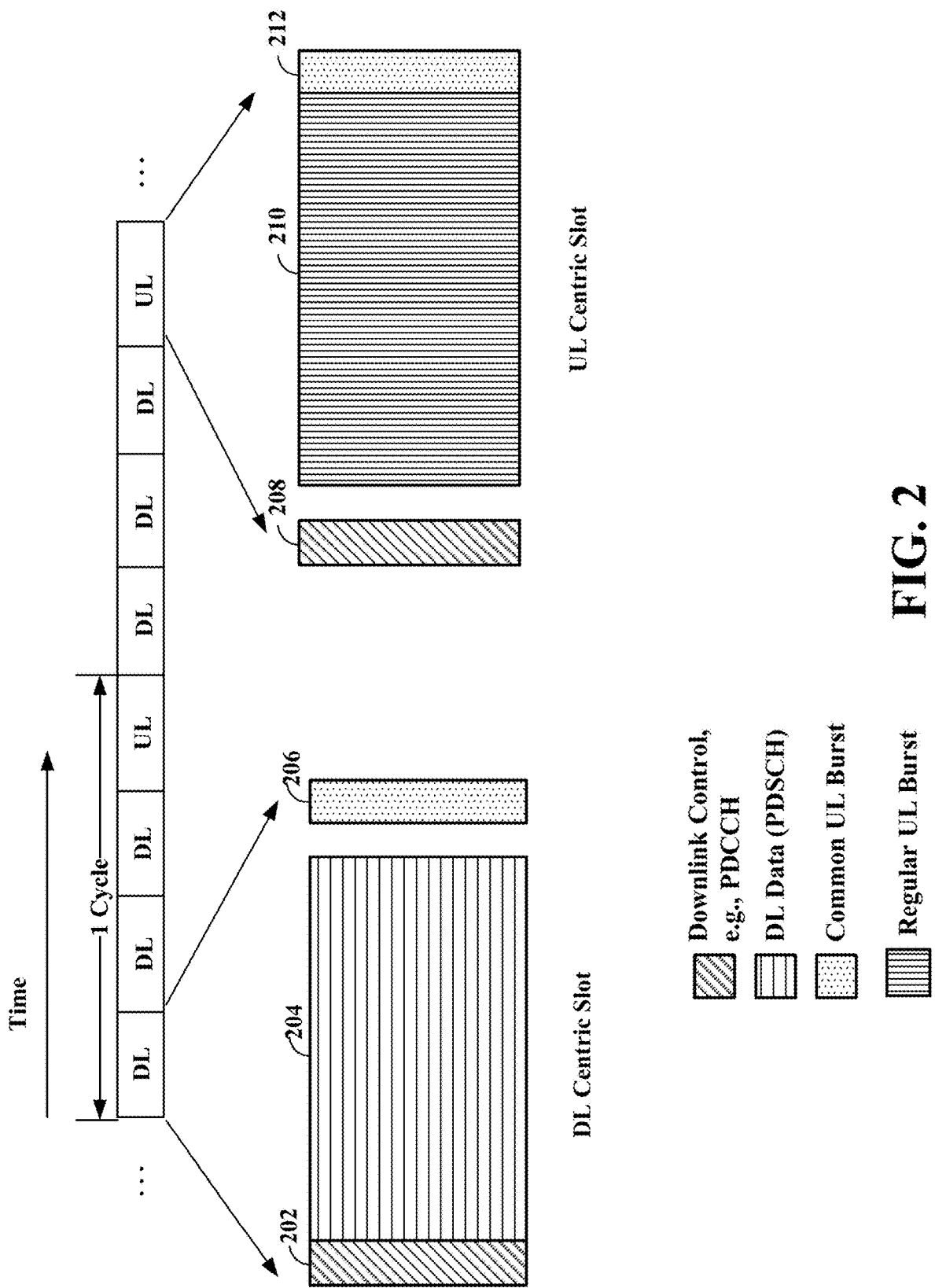
FIG. 2 illustrates an example slot structure for UL centric slots and DL centric slots.

FIG. 2 illustrates an example slot structure comprising DL centric slots and UL centric slots. In NR, a slot may have a duration of 0.5 ms, 0.25 ms, etc., and each slot may have 7 or 14 symbols. A resource grid may be used to represent the time slots, each time slot including one or more time concurrent resource blocks (RBs) (also referred to as physical RBs (PRBs)). The resource blocks for the resource grid may be further divided into multiple resource elements (REs). The number of bits carried by each RE depends on the modulation scheme.

A slot may be DL only or UL only, and may also be DL centric or UL centric. FIG. 2 illustrates an example DL centric slot. The DL centric slot may comprise a DL control region 202, e.g., in which in which physical downlink control channel (PDCCH) is transmitted. Some of the REs of the DL centric slot may carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS).

A physical broadcast channel (PBCH) may carry a master information block (MIB). The MIB provides a number of RBs in the DL system bandwidth, a PHICH configuration, and a system frame number (SFN). The DL centric slot may comprise a DL data region 204, e.g., in which a physical downlink shared channel (PDSCH) carries user data, broadcast system information not transmitted through the PBCH such as system information blocks (SIBs), and paging messages.

The DL centric slot may also comprise a common UL burst region (ULCB) 206 in which UEs may send UL control channel information or other time sensitive or otherwise critical UL transmissions.

For example, the UE may additionally transmit sounding reference signals (SRS). The SRS may be used by an eNB for channel quality estimation to enable frequency-dependent scheduling on the UL. A physical random access channel (PRACH) may be included within one or more slots within a slot structure based on the PRACH configuration. The PRACH allows the UE to perform initial system access and achieve UL synchronization. Additionally, the common UL burst 206 may comprise a physical uplink control channel (PUCCH) that carries uplink control information (UCI), such as scheduling requests, a channel quality indicator (CQI), a precoding matrix indicator (PMI), a rank indicator (RI), and HARQ ACK/NACK feedback.

Similar to the DL centric slot, the UL centric slot may comprise a DL control region 208, e.g., for PDCCH transmissions. The DL control region 202, 208 may comprise a limited number of symbols at the beginning of a slot. The UL centric slot may comprise an UL data region 210, e.g., for the transmission of a Physical Uplink Shared Channel (PUSCH) that carries data, and may additionally be used to carry a buffer status report (BSR), a power headroom report (PHR), and/or UCI. The UL data region 210 may be referred to as a UL regular burst (ULRB) region. The UL centric slot may also comprise a common UL burst region (ULCB) 212 similar to that of the DL based slot 206.

The UL centric slot may comprise a guard band between the UL data region 210 and the ULCB 212. For example, the guard band may be based on the eNB's capabilities and used to reduce interference when the UL data region 210 and the ULCB have different numerologies (symbol periods, slot lengths, etc.). The DL control region 202, 208 may comprise a limited number of symbols at the beginning of a slot and the ULCB region may comprise one or two symbols at the end of the slot, for both the DL centric and the UL centric slots. Resource management of PUSCH or PUCCH transmissions in the ULRB may be similar to that PUSCH or PUCCH for LTE. However, where LTE may be primarily driven by a SC-FDM waveform, NR may be based on an SC-FDM or OFDM waveform in the ULRB 210.

Figure 3:
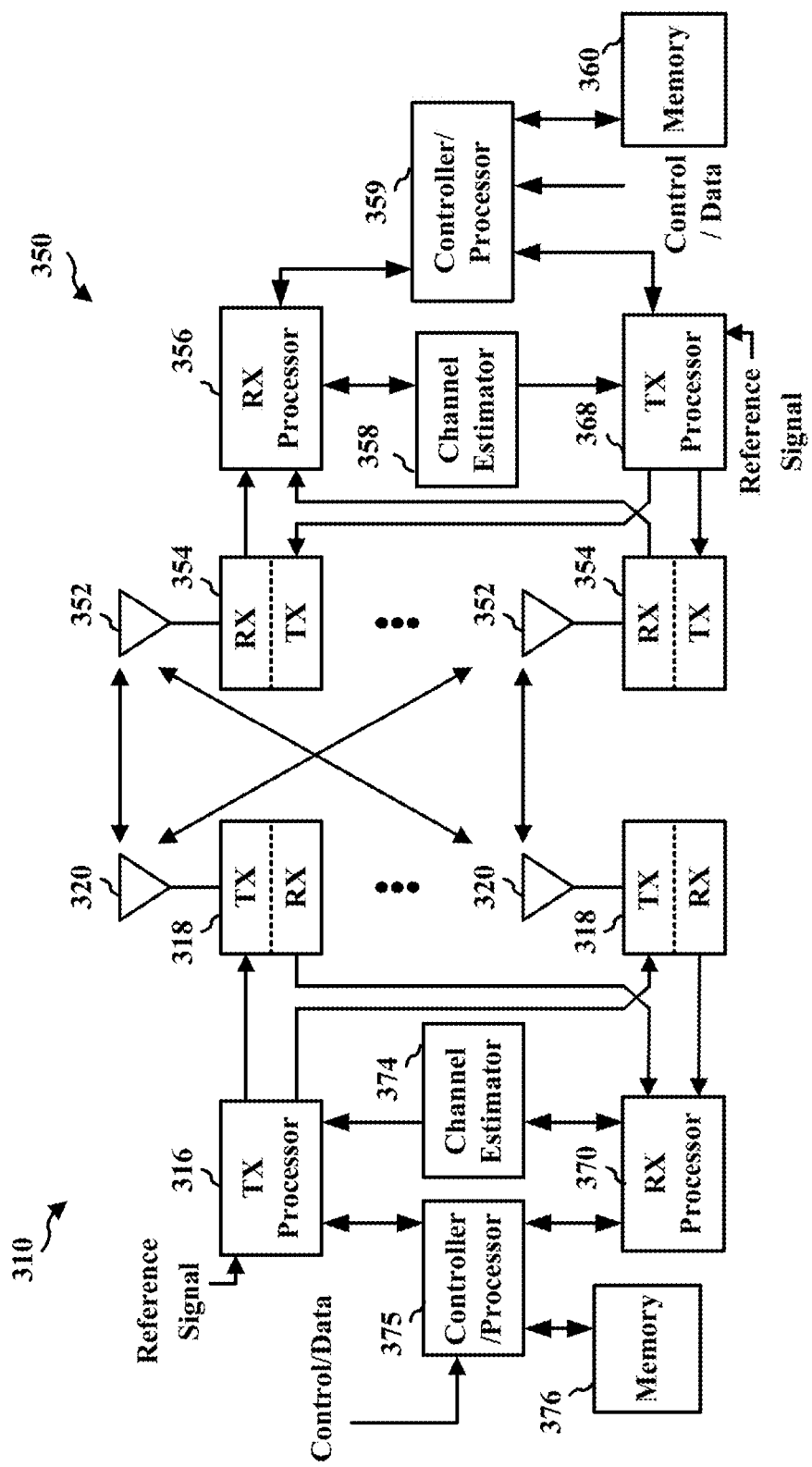
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Control signaling may be used to support the transmission of downlink and uplink data channels. For example, control signaling may enable a UE to successfully receive, demodulate, and decode a data channel. For example, Downlink Control Information (DCI) may be transmitted through a Physical Downlink Control Channel (PDCCH) and may include information about allocation for data communication, format information, information related to HARQ, etc.

To form a PDCCH payload, the DCI may undergo channel coding. The coded DCI bits i.e. PDCCH payload, may then be mapped to one or more Control Channel Elements (CCEs), e.g., according to the PDCCH format. These coded bits are then converted to complex modulated symbols after performing operations including scrambling, QPSK modulation, and precoding. Finally, the modulated symbols are interleaved and mapped to physical Resource Elements (REs).

After performing de-interleaving, de-precoding, symbol combining, symbol demodulation and descrambling at the receiver, a UE may be required to perform blind decoding of the PDCCH payload, as it may not be aware of the detailed control channel structure, including the number of control channels and/or the number of CCEs to which each control channel is mapped. Multiple PDCCHs can be transmitted in a single subframe, and the multiple PDCCHs may or may not be relevant to a particular UE. A UE may find relevant PDCCH(s) by monitoring a set of PDCCH candidates, e.g., a set of CCEs on which a PDCCH could be mapped in a subframe. For example, the UE may only be informed of the number of OFDM symbols within the control portion of a slot and may not be provided with the location of a corresponding PDCCH. For example, the UE may not be informed of the CCEs used for the PDCCH and/or an aggregation level used by the base station. Therefore, the UE finds the PDCCH by monitoring a set of PDCCH candidates, which may be referred to as blind decoding. The monitored set of candidates may correspond to a PDCCH search space determined by the UE. Aspects presented herein address the need for the UE to improve determination of a search space to attempt to receive a downlink control channel.

Figure 4:
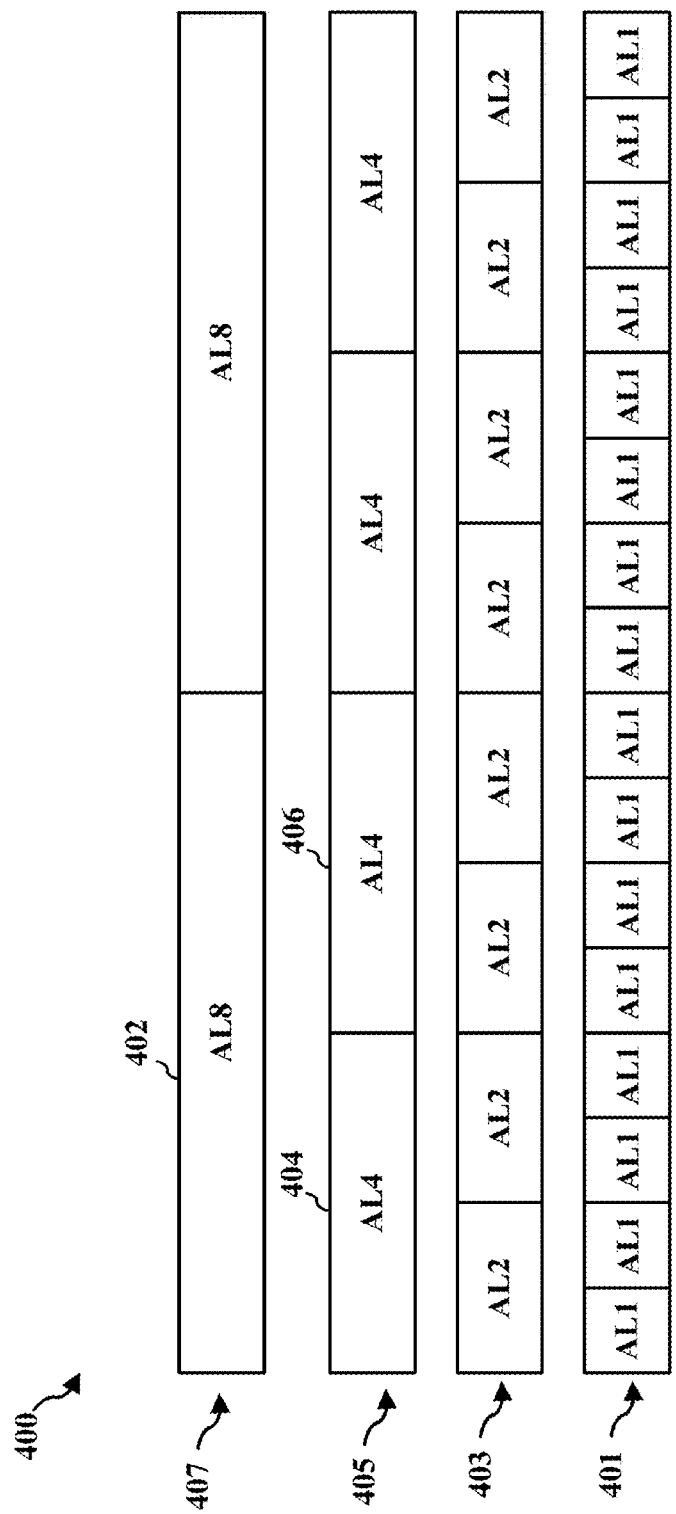
FIG. 4 illustrates an example of decoding candidates based on multiple aggregation levels.
Figure 5:
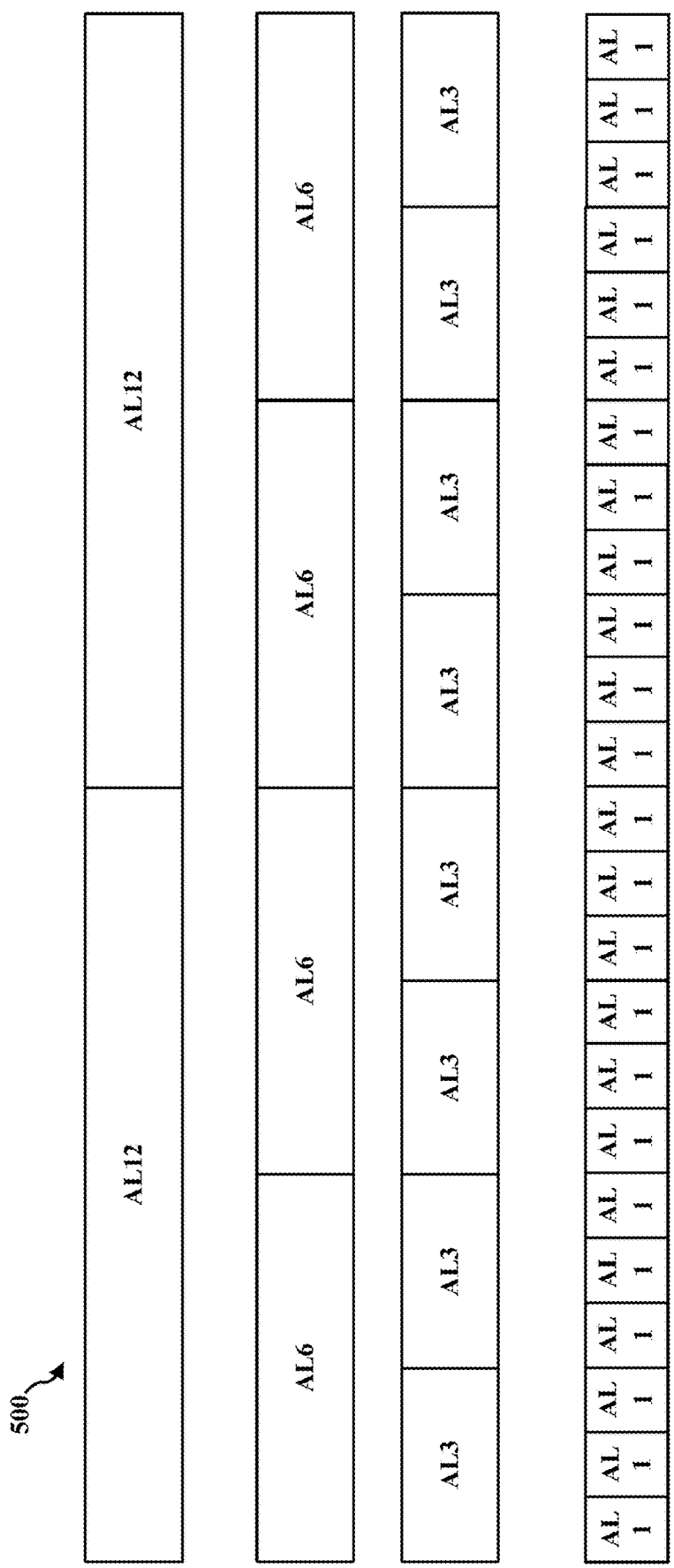
FIG. 5 illustrates an example of decoding candidates based on multiple aggregation levels.

For example, PDCCH search space at an aggregation level in a CORESET may be defined by a set of PDCCH candidates, which may also be referred to herein as decoding candidates. FIGS. 4 and 5 illustrate examples of decoding candidates for multiple aggregation levels. Aggregation levels may include different numbers of CCEs for PDCCH transmission. For example, FIG. 4 illustrates a lowest aggregation level 401 having a single CCE for PDCCH nested within a higher aggregation level 403 having two CCEs for PDCCH. Similarly, aggregation level 403 is nested within an aggregation level 405 having four CCEs for PDCCH. Aggregation level 405 is nested within a highest aggregation level 407 that has eight CCEs for PDCCH. FIG. 5 similarly illustrates multiple, nested aggregation levels. However, in FIG. 5, the different aggregations levels correspond to different numbers of CCEs than in FIG. 4, e.g., 1, 3, 6, and 12 rather than 1, 2, 4, 8.

For the search space at the highest aggregation level in the CORESET, a first CCE index of a PDCCH candidate may be identified by using any of a UE-ID, a candidate number, a total number of CCEs for the PDCCH candidate, a total number of CCEs in the CORESET, and a randomization factor. The other CCE indexes of the PDCCH candidate may be consecutive from the first CCE index.

For each higher aggregation level, a set of decoding candidates may be split into a multiple decoding candidates of a lower aggregation level, e.g., a level correspond to fewer CCEs. FIG. 4 illustrates an example of aggregation levels 400 in which decoding candidates of a highest aggregation level AL8 407 are divided into two decoding candidates of the next lower aggregation level AL4 405, which is in turn divided into two decoding candidates of the lower aggregation level AL2 403. The decoding candidates of aggregation level AL2 403 are in turn divided into two of the lowest aggregation level AL1 401. Where a decoding candidate of AL8 is illustrated as being divided into two decoding candidates of aggregation level AL4, this indicates that the AL8 search space, e.g., 402 and (the box to the right), are split into a set of potential decoding candidates for AL4, including e.g. 404, 406.

FIG. 5 illustrates a second example 500 that is similar to the aggregation level example of FIG. 4, except that aggregation level AL3 supports three decoding candidates from aggregation level AL1. Thus, in this example, the aggregation levels will be 1, 3, 6, 12 rather than the 1, 2, 4, 8 illustrated in FIG. 4.

Thus, in these two examples, for a search space of an aggregation level, e.g., $AL_x$, a number $L_x$ of decoding candidates may be defined. In the example in FIG. 4, x may equal 1, 2, 4, or 8. In the example in FIG. 5, x may equal 1, 3, 6, or 12. The number $L_x$ of decoding candidates for each aggregation level may be configurable or defined.

In a first option, a subset of decoding candidates $L_{x1}$ may be randomly selected from the defined set of decoding candidates of $L_{x2}$ where x2 indicates a next higher aggregation level above x1. For example, in FIG. 4, if x1 is AL1, x2 will be AL2. Similarly, if x1 is AL4, x2 will be AL8. In FIG. 5, if x1 is AL1, x2 will be AL3, and so forth. In FIG. 4, when $L_{AL4}=3$, there are 3 AL4 decoding candidates that can support up to 6 decoding candidates from AL2. If 4 AL2 candidates are needed, such that $L_{AL2}=4$, then those 4 AL2 candidates may be based on a random selection from the 6 possible candidates.

Figure 6A:
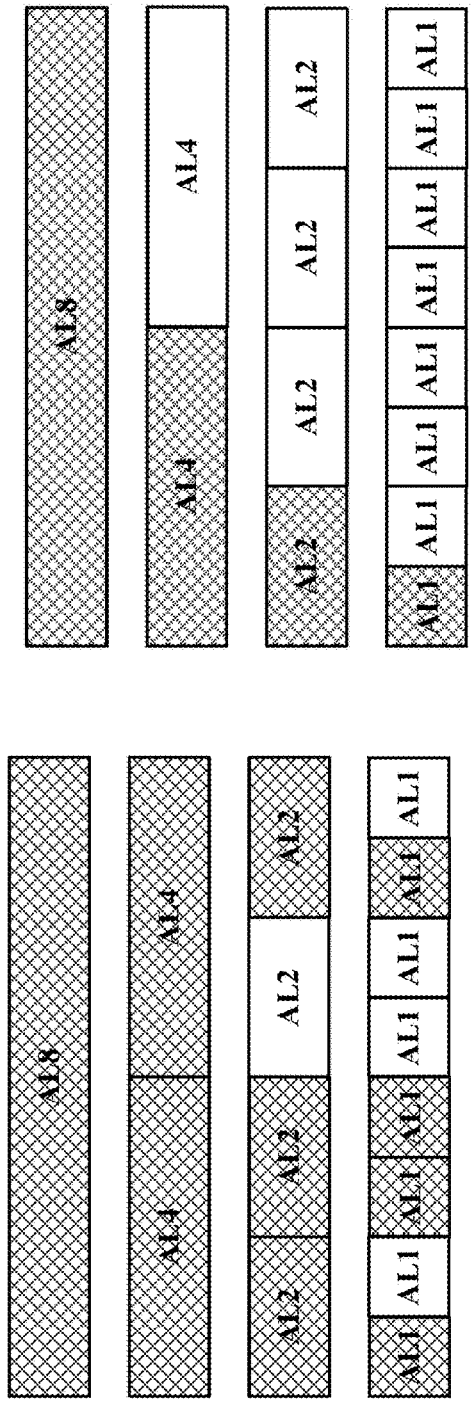
FIGS. 6A and 6B illustrate examples of decoding candidate selection using multiple aggregation levels.

FIG. 6A illustrates an example of this first option, where the decoding candidates for each aggregation level are nested in the next higher layer, e.g., in the next aggregation level layer corresponding to a higher number of decoding candidates. The value of L for the number of decoding candidates needed for each aggregation level may be, e.g., $L_{AL1}=5$, $L_{AL2}=4$, $L_{AL4}=3$, $L_{AL8}=2$. As illustrated in FIG. 4, 2 decoding candidates of AL8 may support 4 decoding candidates of AL4. Therefore, the 3 needed decoding candidates for AL4 may be randomly selected from the 4 possible AL4 decoding candidates supported by the 2 AL8 candidates. Each AL4 candidate supports 2 AL2 decoding candidates. Therefore, the 3 selected AL4 candidates may support 6 possible AL2 candidates. The 4 needed decoding candidates for AL2 may be selected from the 6 possible candidates. Each AL2 candidate supports 2 AL1 decoding candidates. Therefore, the 4 selected AL2 candidates may support 8 possible AL1 candidates. The 5 needed decoding candidates for AL1 may be selected from the 8 possible candidates.

In order for this first option to operate correctly, the number of decoding candidates in one aggregation level may be limited to not exceed an integer multiple (e.g., S) of a number of decoding candidates of the next higher aggregation level. The integer S may be a defined number, e.g., based on a restriction in a search space definition. In FIG. 4, S=2 for each of the aggregation levels. In FIG. 5, S=2 for each aggregation level except AL1. In FIG. 5, S=3 for AL1.

In a second option, a subset of decoding candidates $L_{x1}$ may be randomly selected from the set of decoding candidates of $L_{x2}$ where x2 indicates the highest aggregation level. For example, in FIG. 4, if x1 is AL1, AL2, or AL4, x2 will always be AL8. Similarly, in FIG. 5, x2 will be AL12 when x1 is AL1, AL3, or AL6. As illustrated in FIG. 4, 2 AL8 decoding candidates, e.g., $L_{AL8}=2$, can support up to 8 decoding candidates of AL2. If 4 decoding candidates from AL2 are needed, e.g., $L_{AL2}=4$ is needed, the 4 AL2 decoding candidates may be selected based on a random selection from the 8 possible AL2 candidates that correspond to the highest AL level, AL8.

Figure 6B:
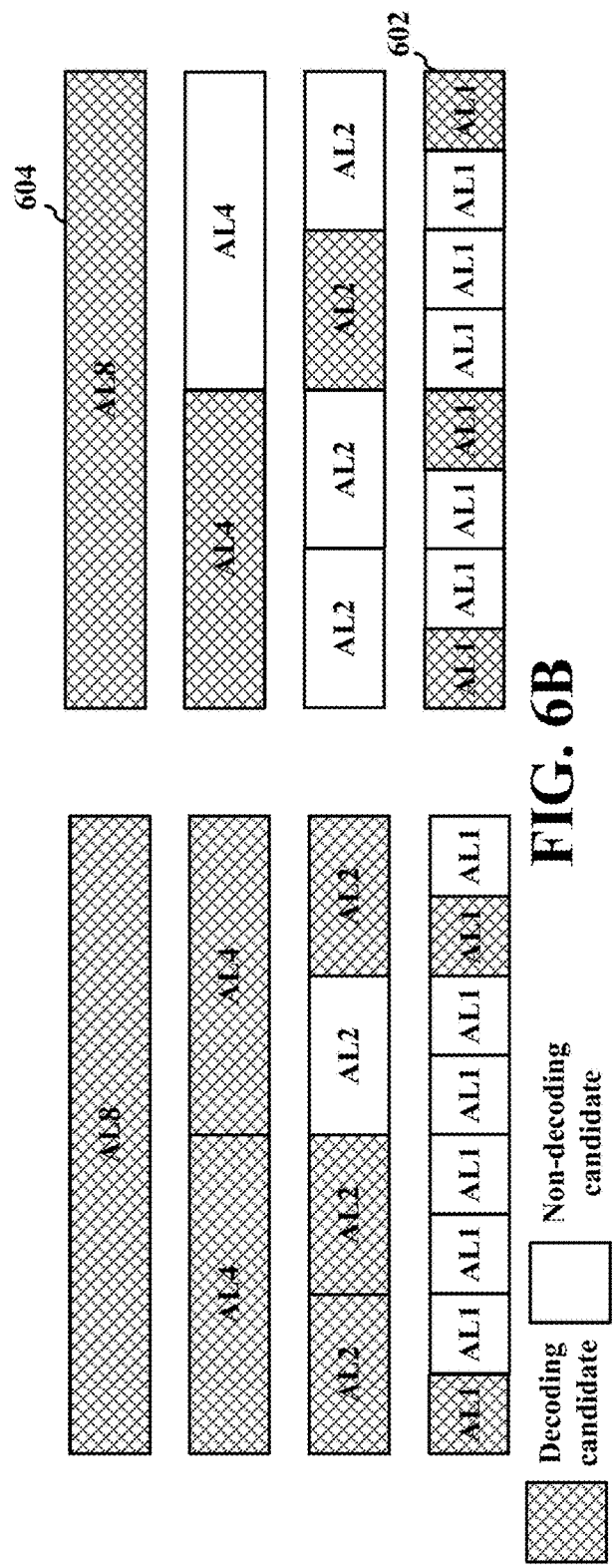

FIG. 6B illustrate examples in which the decoding candidates for each aggregation level are nested in the highest aggregation level, but not necessarily in the decoding candidates of the next higher aggregation level or other intervening aggregation levels. For example, in FIG. 6B, decoding candidate 602 is nested within the highest aggregation level 604, but not within a decoding candidate for aggregation level AL2 or AL4. The value of L for the number of decoding candidates needed for each aggregation level may be, e.g., $L_{AL1}=5$, $L_{AL2}=4$, $L_{AL4}=3$, $L_{AL8}=2$. In this example, the 5 decoding candidates for AL1 may be randomly selected from the 8 possible decoding candidates that are supported by the 2 AL decoding candidates regardless of whether the decoding candidates are supported by the decoding candidates selected for the intervening AL2 or AL4 aggregation levels.

In order for this second option to operate correctly, the number of decoding candidates in one aggregation level may be limited to not exceed an integer multiple (e.g., P) of a number of decoding candidates of the highest aggregation level. P may be based on a ratio between the highest aggregation level and the current aggregation level. For example, in both FIG. 4, P=4 between AL2 and AL8, P=8 between AL1 and AL8, and P=2 between AL4 and AL8. In FIG. 5, P=12 between AL1 and AL12, P=4 between AL 3 and AL12, and P=2 between AL6 and AL12.

The random selection of the number of decoding candidates out of the possible decoding candidates may be based on a permutation. The permutation may be based on a random seed. In an example, the random seed may be a function of any a UE ID, a cell ID, time information (e.g., SFN), and/or an additional configured number.

There may be a problem in selecting decoding candidates when the number of decoding candidates for one aggregation level does not exceed the available possible candidates from a higher aggregation level. For example, if there is 1 AL8 decoding candidate, but 6 AL2 decoding candidates are needed, the 1 AL8 decoding candidate does not support enough AL2 decoding candidates. A single AL8 decoding candidate may only support 4 possible AL2 decoding candidates, whereas 6 are needed. In order to address this problem, at least one augmented decoding candidate may be created to provide support for lower aggregation levels. The augmented decoding candidates might not be actual decoding candidates, but may just provide support for the selection of lower aggregation level decoding candidates. For example, no decoding might be attempted for the augmented decoding candidates. In an example, the CCEs in the augmented decoding candidates may be used to perform channel estimation. The generation of augmented decoding candidates may be based on a decoding candidate profile configured.

For the first option, in which decoding candidates are randomly selected from the selected decoding candidates from the next higher level, e.g., as in FIG. 6A, a determination may be made whether augmented decoding candidates are needed. For example, an analysis may start from a lowest aggregation level to determine whether an augmented decoding candidate is needed in the next level.

For example, if $L_{AL1}=8$, $L_{AL2}=4$, $L_{AL4}=2$, $L_{AL8}=1$, no augmented decoding candidate is needed for any of the aggregation levels, because the needed number of decoding candidates $L_x$ is supported by each of the numbers of the next higher aggregation levels. In contrast, if $L_{AL1}=8$, $L_{AL2}=4$, $L_{AL4}=1$, $L_{AL8}=1$, then one augmented decoding candidate may be needed for AL4, because $L_{AL4}=1$ supports only 2 decoding candidates at AL2, but 4 decoding candidates need to be selected for AL4.

Starting from the lowest AL, a determination may be made as to whether augmented decoding candidates are needed for a higher level based on a number of decoding candidates needed $LL_x$, S, and a number of decoding candidates in a next higher layer ($L_{x1}$), where LL indicates the number of decoding candidates to be selected from the corresponding aggregation level x. Thus, LL indicates the number of decoding candidates plus any additional augmented decoding candidates. For example $LL_{x0}$ may indicate the number of decoding candidates needed for the lowest level x0.

An increase of S may be assumed between aggregation levels $AL_{x1}$ to $AL_{x2}$, where S is typically 2, except from AL1 to AL3 S=3, as described supra.

When ceiling $(LL_{x1}/S) \le L_{x2}$, then no augmented decoding candidate for $AL_{x2}$ is needed, because the number of decoding candidates needed for $AL_{x1}$ is below the number supported by the number of selected decoding candidates $AL_{x2}$.

However, when ceiling $(LL_{x1}/S) > L_{x2}$ then a number of augmented decoding candidates may be added for ALx2, the number being equal to $(LL_{x1}/S) - L_{x2}$. $LL_{x2}$=max ceiling $(LL_{x1}/S, L_{x2})$.

The determination of whether augmented decoding candidates are needed at a next higher may begin with the lowest aggregation and may continue until the highest aggregation level is reached.

In the example in which $L_{AL1}$=8, $L_{AL2}$=4, $L_{AL4}$=1, $L_{AL8}$=1, then:
$LL_{AL1}$=$L_{AL1}$=8
$LL_{AL2}$=$L_{AL2}$=4
$LL_{AL4}$=$LL_{AL2}$/2=2. However, $L_{AL4}$=1. Thus, $LL_{AL2}$/2>$L_{AL4}$.
$LL_{AL8}$=$L_{AL8}$=1

FIG. 7A illustrates an example in which there is a single AL8 decoding candidate 702, a single AL4 decoding candidate 704, and four AL2 decoding candidates 706. In this example, 12 decoding candidates 708 need to be selected for AL1. Thus, $LL_{AL1}$=$L_{AL1}$=12. In this example, augmented decoding candidates are needed for AL2, e.g., because $(LL_{AL1}/S) > L_{AL2}$, for example 12/2>4. Therefore, two additional augmented decoding candidates are created for AL2 so that AL2 has 6 decoding candidates, which is equal to $LL_{AL1}/S$=12/2=6. As the number of decoding candidates needed for AL2, based on the needs of AL1, is 6, additional augmented decoding candidates are created for AL4. For example, $(LL_{AL2}/S) > L_{AL4}$. In this example, $LL_{AL2}/S$=6/2=3, which is greater than $L_{AL2}$=1. In this example, 3 decoding candidates are needed for AL4 to equal $LL_{AL2}/S$=6/2=3. Therefore, two additional augmented decoding candidates are created for AL4. Similarly, due to the number of decoding candidates needed for AL4, based AL4 needing 3 decoding candidates, an additional augmented decoding candidate is created for AL8. For example, $(LL_{AL4}/S) > L_{AL8}$. In this example, $LL_{AL4}/S$=3/2=1.5, which is greater than $L_{AL8}$=1. In this example, two decoding candidates are needed for AL8 to be equal to or greater than $LL_{AL4}/S$=3/2=1.5. Therefore, an additional augmented decoding candidate is created for AL8.

For the second option, in which decoding candidates are randomly selected from the selected decoding candidates from the highest aggregation level, e.g., as in FIG. 6B, a determination may also be made whether augmented decoding candidates are needed. In this example, the UE only needs to determine whether augmented decoding candidate(s) are needed for the highest aggregation level, not for intervening aggregation levels. For each aggregation level other than the highest aggregation level, $P_x$ may represent an aggregation level ratio of $AL_x$ and the highest aggregation level. In FIG. 4, x may be 1, 2, and 4. In FIG. 5, x may be 1, 3, and 6. For example, an analysis may start from a lowest aggregation level to determine whether an augmented decoding candidate is needed in the next level. A computation may be made of $LL_{ALX}$=max $(L_{ALX}/P_x, L_{MAX})$. $L_{MAX}$ is the number of decoding candidates of the highest aggregation level. The number of decoding candidates needed for the highest aggregation level ($LL_{MAX}$) is $LL_{MAX}$=max($LL_{ALx}$ for all x, and $L_{MAX}$). $LL_{MAX}$-$L_{MAX}$ is the number of augmented decoding candidates to be added for the highest aggregation level.

For example, if $L_{AL1}$=8, $L_{AL2}$=4, $L_{AL4}$=2, $L_{AL8}$=1, no augmented decoding candidate is needed for any of the aggregation levels, because the needed number of decoding candidates for the highest aggregation level $LL_{MAX}$ based on the requirements of each of the lower aggregation levels is not more than the actual number of decoding candidates for the highest level, e.g., $L_{AL8}$=1 supports enough decoding candidates at AL1, AL2, and AL4.

In the example in which $L_{AL1}$=8, $L_{AL2}$=4, $L_{AL4}$=1, $L_{AL8}$=1, then one augmented decoding candidate is needed for the highest aggregation level AL8. In this example, $LL_{MAX}$=2 while $L_{MAX}$=1. Thus, the number of needed augmented decoding candidates is $LL_{MAX}$-$L_{MAX}$=1.

FIG. 7B illustrates an example based on this second option. FIG. 7B illustrates a single AL8 decoding candidate 702, a single AL4 decoding candidate 704, and four AL2 decoding candidates 706. In this example, 12 decoding candidates 708 need to be selected for AL1. Thus, $LL_{AL1}$=$L_{AL1}$=12. In this example, augmented decoding candidates are needed for AL8, e.g., because $LL_{MAX}$=2, based on the requirements of 12 decoding candidates for AL1. Thus, the number of augmented decoding candidates to be added for AL8 is $LL_{MAX}$-$L_{MAX}$=2-1=1. In contrast to FIG. 7A, in FIG. 7B, augmented decoding candidates are not created for the intervening aggregation levels, because the decoding candidate selection is based only on the highest aggregation level.

Figure 8:
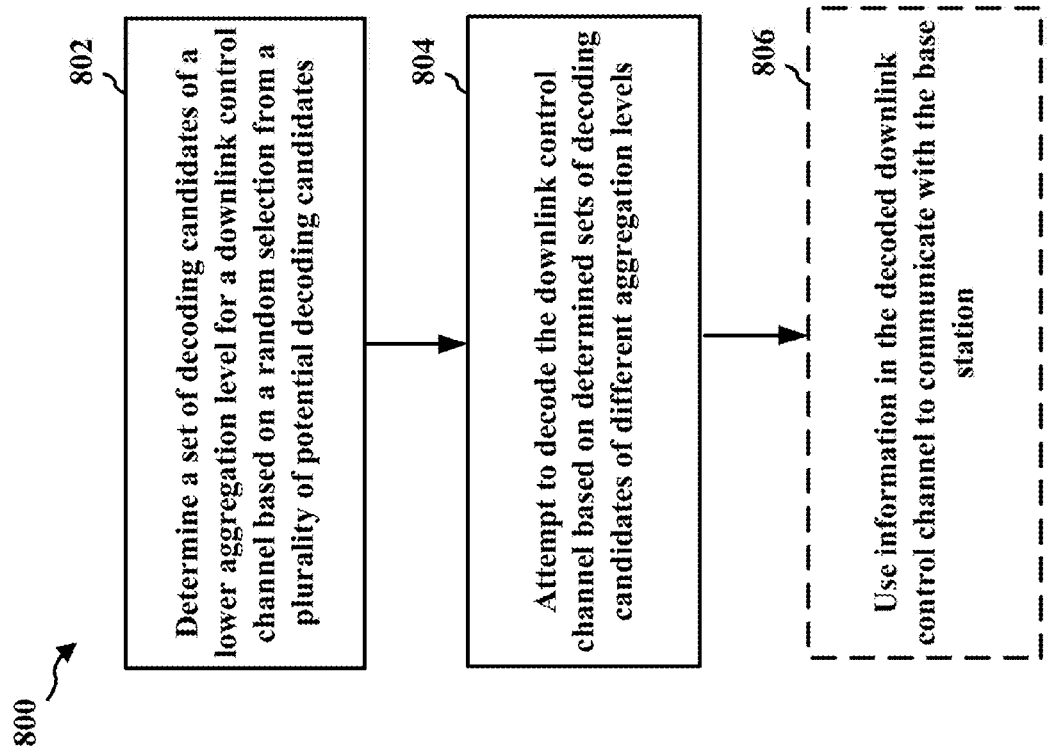
FIG. 8 is a flowchart of a method of wireless communication.

FIG. 8 is a flowchart 800 of a method of wireless communication. The method may be performed by a UE (e.g., UE 104, 350, the apparatus 902, 902'). At 802, the UE determines a set of decoding candidates of a lower aggregation level for a downlink control channel based on a random selection from a plurality of potential decoding candidates. The set of decoding candidates of a certain aggregation level may also be referred to as a search space of that aggregation level. The plurality of potential decoding candidates are defined from a second set of decoding candidates of a higher aggregation level, e.g., as described in connection with FIGS. 4-7B. The downlink control channel may comprise a PDCCH, for example.

The first set of lower aggregation level decoding candidates may be randomly selected from the plurality of potential decoding candidates based on at least one of a user equipment identifier, a cell identifier, time information, and a configured random number.

At 804, the UE attempts to decode the downlink control channel based on determined sets of decoding candidates of different aggregation levels.

The higher aggregation level may comprise a next higher aggregation level, as described in connection with FIG. 6A. The resource elements in a decoding candidate in the higher aggregation level may be uniformly split into integer sets of resource elements, each supporting a potential decoding candidate for the lower aggregation level, wherein the integer is based on an aggregation level ratio between the higher aggregation level and the lower aggregation level.

A first number of decoding candidates comprised in a lower aggregation level may be within an integer multiple, e.g., S, of a second number of decoding candidates comprised in a next higher aggregation level, wherein the integer is based on an aggregation level ratio between the higher aggregation level and the lower aggregation level. FIG. 4 illustrates at example having an integer multiple of 2 between aggregation levels. FIG. 5 illustrates an example having an integer multiple of 2 or 3 between aggregation levels.

The second set of decoding candidates of the higher aggregation level may comprise one or more augmented decoding candidates when a first number of decoding candidates comprised in the lower aggregation level is not within an integer multiple of a second number of decoding candidates comprised in the next higher aggregation level, wherein the integer is based on the aggregation level ratio between the higher aggregation level and the lower aggregation level. An example is described in connection with FIG. 7A.

In another example, the higher aggregation level may comprise a highest aggregation level, e.g., as described in connection with FIG. 6B. The resource elements in a decoding candidate in the highest aggregation level may be uniformly split into integer sets of resource elements, each supporting a potential decoding candidate for the lower aggregation level, wherein the integer is based on an aggregation level ratio between the highest aggregation level and the lower aggregation level A first number of decoding candidates comprised in a lower aggregation level may be within an integer multiple of a second number of decoding candidates comprised in the highest aggregation level, wherein the integer is based on an aggregation level ratio, e.g., P, between the highest aggregation level and the lower aggregation level, The second set of higher aggregation level decoding candidates may comprise one or more augmented decoding candidates when a first number of decoding candidates comprised in a lower aggregation level is not within the integer multiple of a second number of decoding candidates comprised in the highest aggregation level, wherein the integer is based on an aggregation level ratio between the highest aggregation level and the lower aggregation level, e.g., as described in connection with FIG. 7B.

Once the UE decodes the downlink control channel, at 806, the UE may use the information in the decoded downlink control channel to communicate with the base station. For example, the UE may use information in the downlink control channel to receive PDSCH, to transmit PUSCH, etc.

Figure 9:
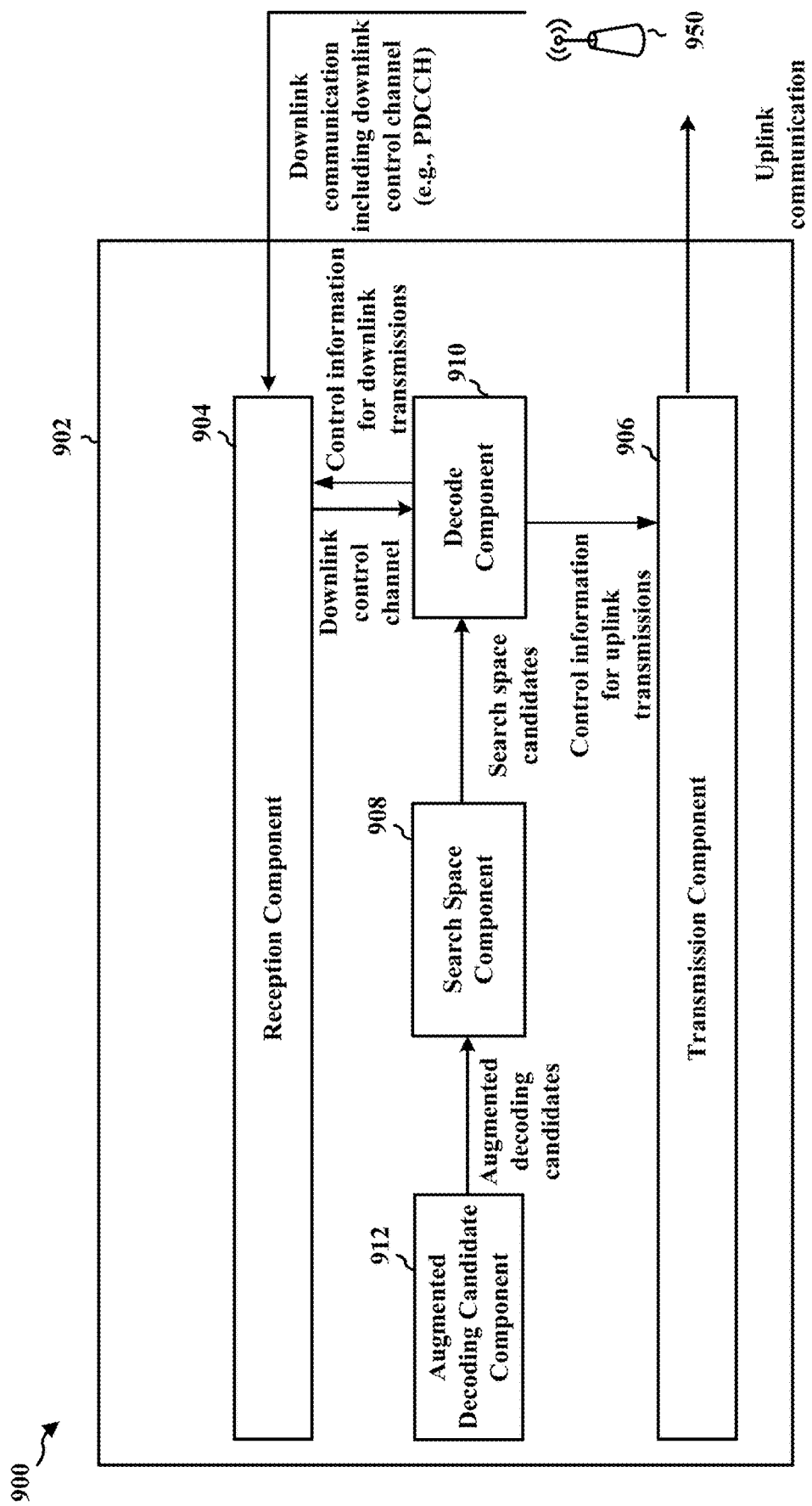
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE (e.g., UE 104, 350). The apparatus includes a reception component 904 that receives downlink communication from a base station 950, e.g., including a downlink control channel. The apparatus includes a transmission component 906 that transmits uplink communication to the base station. The apparatus may comprise a search space component 908 configured to determine a set of decoding candidates of a lower aggregation level for a downlink control channel based on a random selection from a plurality of potential decoding candidates, wherein the plurality of potential decoding candidates are defined from a second set of decoding candidates of a higher aggregation level, e.g., as described in connection with FIGS. 4-7B. The downlink control channel comprises a PDCCH, for example.

The apparatus may include a decode component 910 configured to attempt to decode the downlink control channel based on determined sets of decoding candidates of different aggregation levels.

The apparatus may also include an augmented decoding candidate component 912 configured to determine whether to create an augmented decoding candidate at a higher or highest aggregation level, as described in connection with FIG. 7A or 7B, and to provide the augmented decoding candidate to the search space component 908 when one is needed.

Once the decode component 910 successfully decodes the downlink control channel, the reception component 904 may use the control information to receive downlink communication from the base station 950 and/or the transmission component 906 may use the control information to transmit uplink communication to the bases station 950.

The apparatus may include additional components that perform each of the blocks of the algorithm in the aforementioned flowchart of FIG. 8 and the aspects described in connection with FIGS. 4-7B. As such, each block in the aforementioned flowchart of FIG. 8 and the aspects described in connection with FIGS. 4-7B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
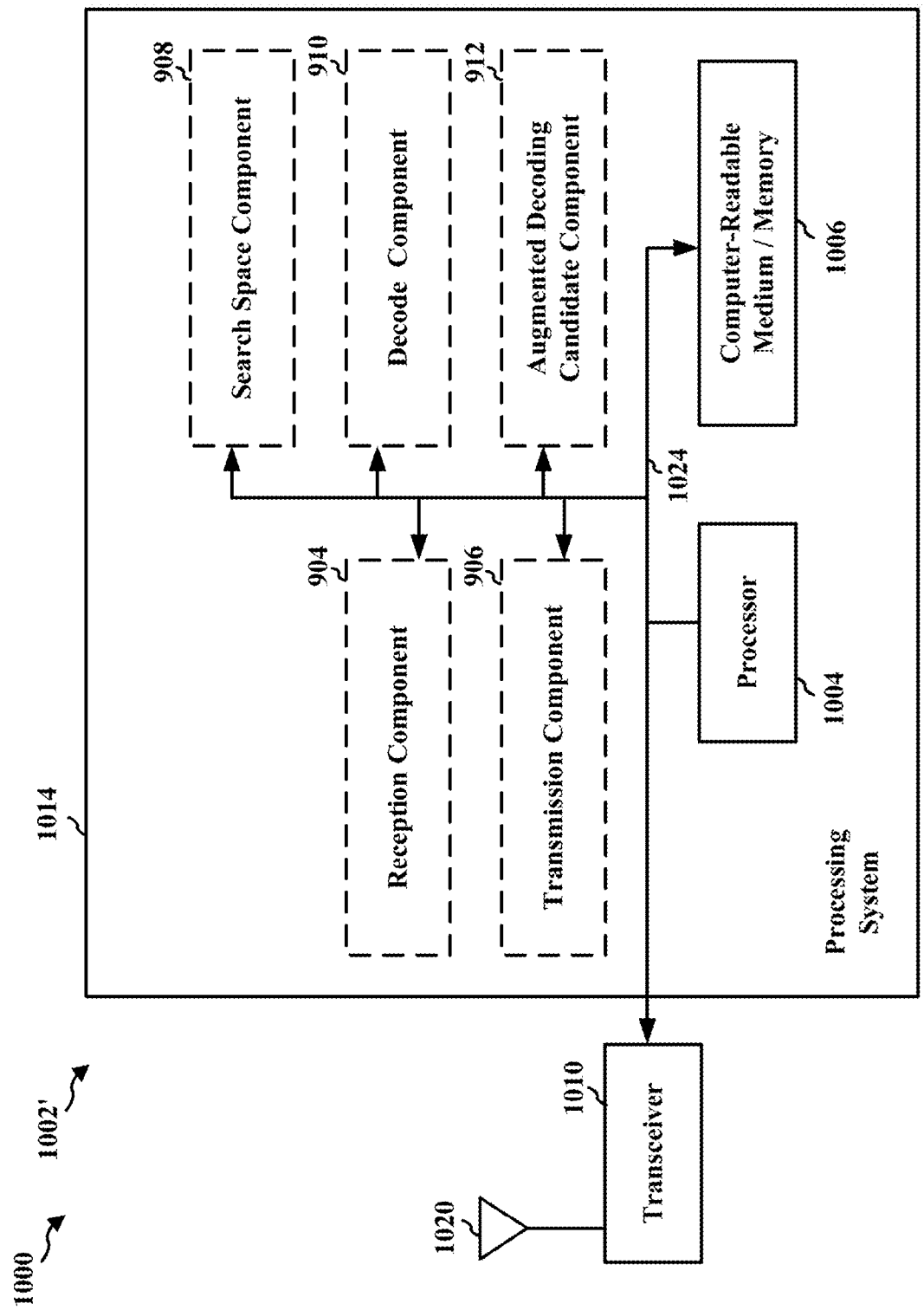
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912. The components may be software components running in the processor 1004, resident/stored in the computer readable medium/memory 1006, one or more hardware components coupled to the processor 1004, or some combination thereof.

The processing system 1014 may be a component of the UE 350 and may include the memory 360 and/or at least one of the TX processor 368, the RX processor 356, and the controller/processor 359.

In one configuration, the apparatus 902/902' for wireless communication includes means for determining a set of decoding candidates of a lower aggregation level for a downlink control channel based on a random selection from a plurality of potential decoding candidates, wherein the plurality of potential decoding candidates are defined from a second set of decoding candidates of a higher aggregation level; and means for attempting to decode the downlink control channel based on determined sets of decoding candidates of different aggregation levels.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
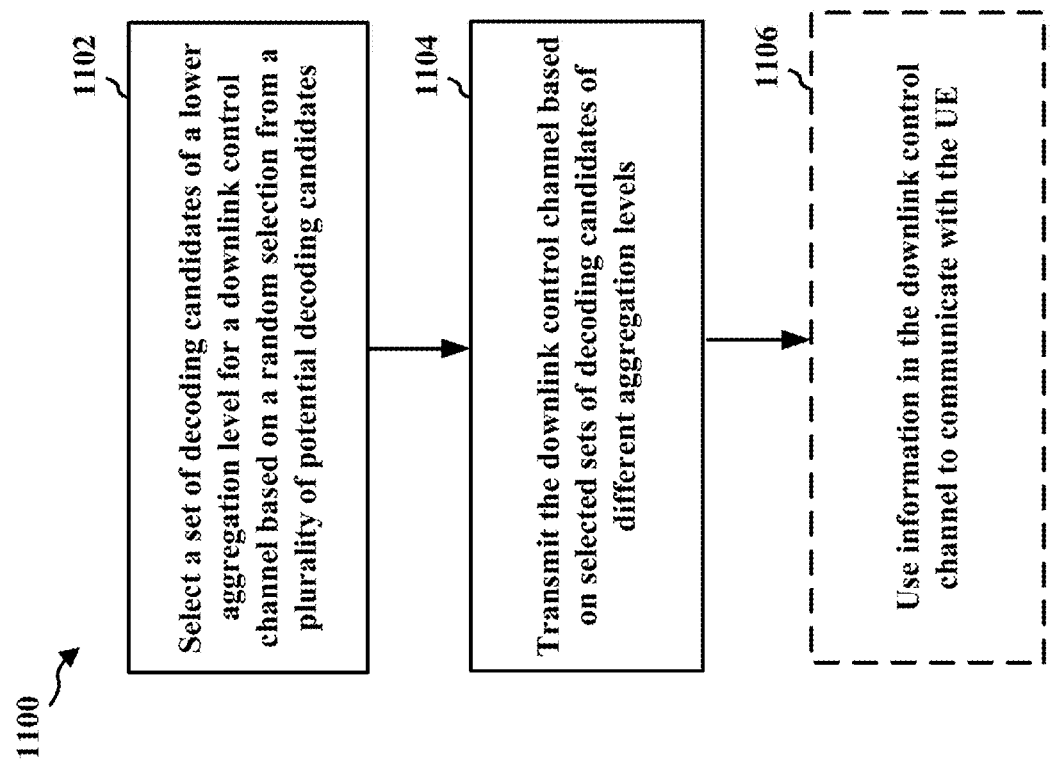
FIG. 11 is a flowchart of a method of wireless communication.

FIG. 11 is a flowchart 1100 of a method of wireless communication. The method may be performed by a base station (e.g., base station 102, 180, 310, 950, the apparatus 1202, 1202'). At 1102, the base station selects a set of decoding candidates of a lower aggregation level for a downlink control channel based on a random selection from a plurality of potential decoding candidates. The set of decoding candidates of a certain aggregation level may also be referred to as a search space of that aggregation level. The plurality of potential decoding candidates are defined from a second set of decoding candidates of a higher aggregation level, e.g., as described in connection with FIGS. 4-7B. The downlink control channel may comprise a PDCCH, for example.

The first set of lower aggregation level decoding candidates may be randomly selected from the plurality of potential decoding candidates based on at least one of a user equipment identifier, a cell identifier, time information, and a configured random number.

At 1104, the base station transmits the downlink control channel based on selected sets of decoding candidates of different aggregation levels, e.g., sets selected at 1102. The UE will attempt to receive the downlink control channel based on a similar determination of sets of decoding candidates.

The higher aggregation level may comprise a next higher aggregation level, as described in connection with FIG. 6A. The resource elements in a decoding candidate in the higher aggregation level may be uniformly split into integer sets of resource elements, each supporting a potential decoding candidate for the lower aggregation level, wherein the integer is based on an aggregation level ratio between the higher aggregation level and the lower aggregation level.

A first number of decoding candidates comprised in a lower aggregation level may be within an integer multiple, e.g., S, of a second number of decoding candidates comprised in a next higher aggregation level, wherein the integer is based on an aggregation level ratio between the higher aggregation level and the lower aggregation level. FIG. 4 illustrates at example having an integer multiple of 2 between aggregation levels. FIG. 5 illustrates an example having an integer multiple of 2 or 3 between aggregation levels.

The second set of decoding candidates of the higher aggregation level may comprise one or more augmented decoding candidates when a first number of decoding candidates comprised in the lower aggregation level is not within an integer multiple of a second number of decoding candidates comprised in the next higher aggregation level, wherein the integer is based on the aggregation level ratio between the higher aggregation level and the lower aggregation level. An example is described in connection with FIG. 7A.

In another example, the higher aggregation level may comprise a highest aggregation level, e.g., as described in connection with FIG. 6B. The resource elements in a decoding candidate in the highest aggregation level may be uniformly split into integer sets of resource elements, each supporting a potential decoding candidate for the lower aggregation level, wherein the integer is based on an aggregation level ratio between the highest aggregation level and the lower aggregation level A first number of decoding candidates comprised in a lower aggregation level may be within an integer multiple of a second number of decoding candidates comprised in the highest aggregation level, wherein the integer is based on an aggregation level ratio, e.g., P, between the highest aggregation level and the lower aggregation level, The second set of higher aggregation level decoding candidates may comprise one or more augmented decoding candidates when a first number of decoding candidates comprised in a lower aggregation level is not within the integer multiple of a second number of decoding candidates comprised in the highest aggregation level, wherein the integer is based on an aggregation level ratio between the highest aggregation level and the lower aggregation level, e.g., as described in connection with FIG. 7B.

The downlink control channel transmitted at 1104 may comprise information for the UE to use in communication with the base station, whether uplink or downlink. Thus, at 1106, the base station may use the information transmitted in the downlink control channel to communicate with the UE. For example, the downlink control channel may include information that enables the UE to receive PDSCH, to transmit PUSCH, etc.

Figure 12:
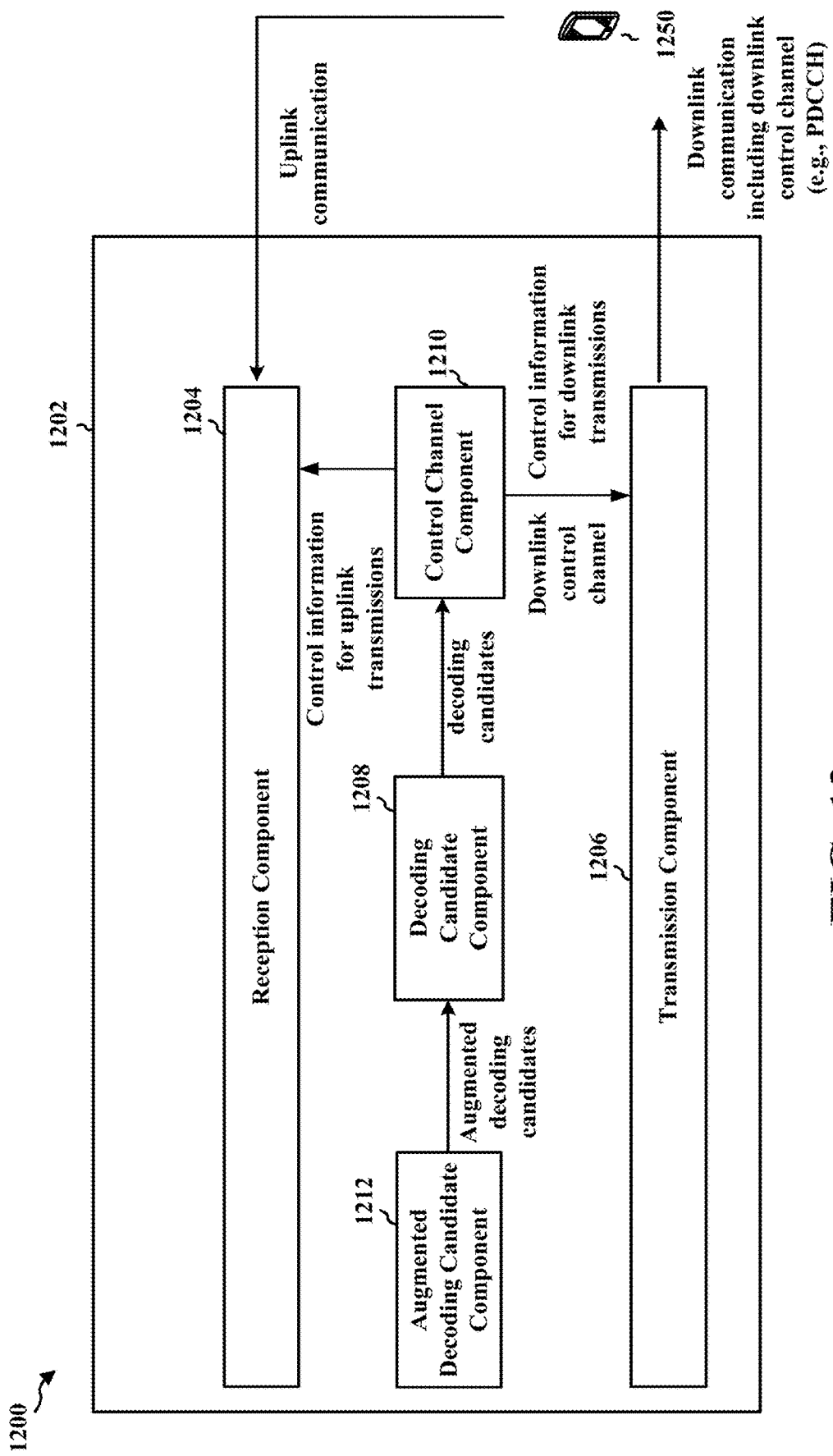
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a base station (e.g., base station 102, 180, 310, 950). The apparatus includes a reception component 1204 that receives uplink communication from a UE 1250. The apparatus includes a transmission component 1206 that transmits downlink communication to the UE, e.g., including a downlink control channel. The apparatus may comprise a decoding candidate component 1208 configured to select a set of decoding candidates of a lower aggregation level for a downlink control channel based on a random selection from a plurality of potential decoding candidates, wherein the plurality of potential decoding candidates are defined from a second set of decoding candidates of a higher aggregation level, e.g., as described in connection with FIGS. 4-7B, and step 1102 in FIG. 11. The downlink control channel may comprise a PDCCH, for example.

The apparatus may include a control channel component 1210 configured to transmit the downlink control channel based on selected sets of decoding candidates of different aggregation levels, e.g., as described in connection with step 1104 in FIG. 11.

The apparatus may also include an augmented decoding candidate component 1212 configured to determine whether to create an augmented decoding candidate at a higher or highest aggregation level, as described in connection with FIG. 7A or 7B, and to provide the augmented decoding candidate to the decoding candidate component 1208 when one is needed.

Once the control channel component 1210 successfully transmits the downlink control channel, the reception component 1204 may use the control information to receive uplink communication from the UE 1250 and/or the transmission component 1206 may use the control information to transmit downlink communication to the UE 1250.

The apparatus may include additional components that perform each of the blocks of the algorithm in the aforementioned flowchart of FIG. 11 and the aspects described in connection with FIGS. 4-7B. As such, each block in the aforementioned flowchart of FIG. 11 and the aspects described in connection with FIGS. 4-7B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
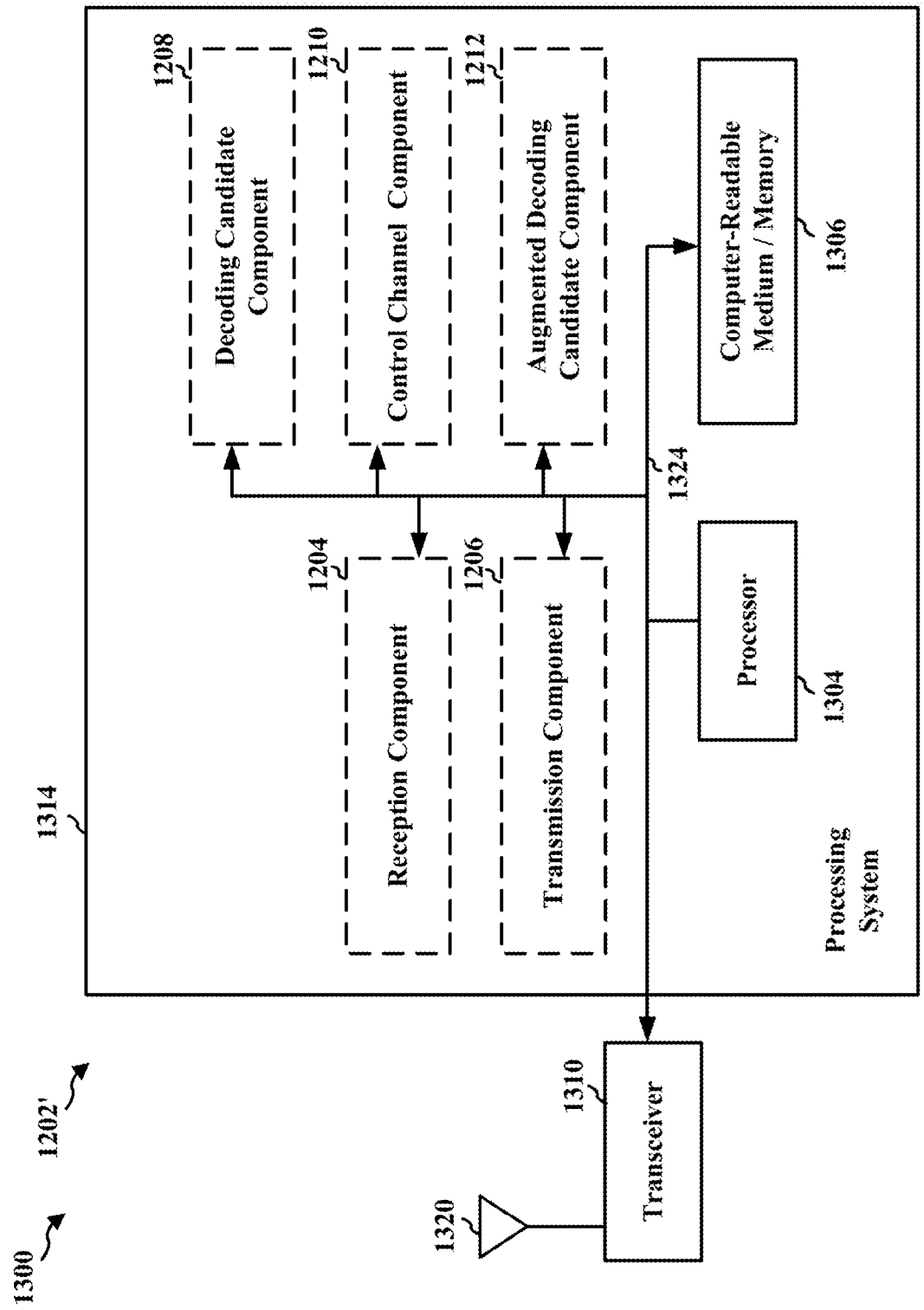
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375.

In one configuration, the apparatus 1202/1202' for wireless communication includes means for selecting a set of decoding candidates of a lower aggregation level for a downlink control channel based on a random selection from a plurality of potential decoding candidates, wherein the plurality of potential decoding candidates are defined from a second set of decoding candidates of a higher aggregation level; means for transmitting the downlink control channel based on selected sets of decoding candidates of different aggregation levels, and means for communicating with a UE based on information transmitted in the downlink control channel. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment, comprising:
    determining a set of decoding candidates of a lower aggregation level for a downlink control channel based on a random selection from a plurality of potential decoding candidates, wherein the plurality of potential decoding candidates are defined from a second set of decoding candidates of a higher aggregation level, wherein the second set of decoding candidates of the higher aggregation level comprises one or more augmented decoding candidates when a first number of decoding candidates comprised in the lower aggregation level is not within an integer multiple of a second number of decoding candidates comprised in the higher aggregation level; and
    attempting to decode the downlink control channel based on determined sets of decoding candidates of different aggregation levels.

2. The method of claim 1, wherein the downlink control channel comprises a physical downlink control channel (PDCCH).

3. The method of claim 1, wherein the higher aggregation level comprises a highest aggregation level.

4. The method of claim 3, wherein resource elements in a decoding candidate in the highest aggregation level are uniformly split into integer sets of resource elements, each supporting a potential decoding candidate for the lower aggregation level, wherein the integer is based on an aggregation level ratio between the highest aggregation level and the lower aggregation level.

5. The method of claim 3, wherein the first number of decoding candidates comprised in the lower aggregation level is within an integer multiple of a second number of decoding candidates comprised in the highest aggregation level, wherein the integer multiple is based on an aggregation level ratio between the highest aggregation level and the lower aggregation level.

6. The method of claim 3, wherein the integer multiple is based on an aggregation level ratio between the highest aggregation level and the lower aggregation level.

7. The method of claim 1, wherein the set of lower aggregation level decoding candidates are randomly selected from the plurality of potential decoding candidates based on at least one of a user equipment identifier, a cell identifier, time information, and a configured random number.

8. The method of claim 1, wherein the higher aggregation level comprises a next higher aggregation level.

9. The method of claim 8, wherein resource elements in a decoding candidate in the higher aggregation level are uniformly split into integer sets of resource elements, each supporting a potential decoding candidate for the lower aggregation level, wherein the integer is based on an aggregation level ratio between the higher aggregation level and the lower aggregation level.

10. The method of claim 8, wherein the first number of decoding candidates comprised in the lower aggregation level is within an integer multiple of a second number of decoding candidates comprised in the next higher aggregation level, wherein the integer multiple is based on an aggregation level ratio between the next higher aggregation level and the lower aggregation level.

11. The method of claim 8, wherein the integer multiple is based on the aggregation level ratio between the next higher aggregation level and the lower aggregation level.

12. An apparatus for wireless communication at a user equipment, comprising:
    means for determining a set of decoding candidates of a lower aggregation level for a downlink control channel based on a random selection from a plurality of potential decoding candidates, wherein the plurality of potential decoding candidates are defined from a second set of decoding candidates of a higher aggregation level, wherein the second set of decoding candidates of the higher aggregation level comprises one or more augmented decoding candidates when a first number of decoding candidates comprised in the lower aggregation level is not within an integer multiple of a second number of decoding candidates comprised in the higher aggregation level; and
    means for attempting to decode the downlink control channel based on determined sets of decoding candidates of different aggregation levels.

13. The apparatus of claim 12, wherein the downlink control channel comprises a physical downlink control channel (PDCCH).

14. The apparatus of claim 12, wherein the higher aggregation level comprises a highest aggregation level.

15. The apparatus of claim 14, wherein resource elements in a decoding candidate in the highest aggregation level are uniformly split into integer sets of resource elements, each supporting a potential decoding candidate for the lower aggregation level, wherein the integer is based on an aggregation level ratio between the highest aggregation level and the lower aggregation level.

16. The apparatus of claim 14, wherein the first number of decoding candidates comprised in the lower aggregation level is within an integer multiple of a second number of decoding candidates comprised in the highest aggregation level, wherein the integer multiple is based on an aggregation level ratio between the highest aggregation level and the lower aggregation level.

17. The apparatus of claim 14, wherein the integer multiple is based on an aggregation level ratio between the highest aggregation level and the lower aggregation level.

18. The apparatus of claim 12, wherein the first set of lower aggregation level decoding candidates are randomly selected from the plurality of potential decoding candidates based on at least one of a user equipment identifier, a cell identifier, time information, and a configured random number.

19. An apparatus for wireless communication at a user equipment, comprising:
- a memory; and
- at least one processor coupled to the memory and configured to:
  - determine a set of decoding candidates of a lower aggregation level for a downlink control channel based on a random selection from a plurality of potential decoding candidates, wherein the plurality of potential decoding candidates are defined from a second set of decoding candidates of a higher aggregation level, wherein the second set of decoding candidates of the higher aggregation level comprises one or more augmented decoding candidates when a first number of decoding candidates comprised in the lower aggregation level is not within an integer multiple of a second number of decoding candidates comprised in the higher aggregation level; and
  - attempt to decode the downlink control channel based on determined sets of decoding candidates of different aggregation levels.

20. The apparatus of claim 19, wherein the downlink control channel comprises a physical downlink control channel (PDCCH).

21. The apparatus of claim 19, wherein the higher aggregation level comprises a highest aggregation level.

22. The apparatus of claim 21, wherein resource elements in a decoding candidate in the highest aggregation level are uniformly split into integer sets of resource elements, each supporting a potential decoding candidate for the lower aggregation level, wherein the integer is based on an aggregation level ratio between the highest aggregation level and the lower aggregation level.

23. The apparatus of claim 21, wherein the first number of decoding candidates comprised in the lower aggregation level is within an integer multiple of a second number of decoding candidates comprised in the highest aggregation level, wherein the integer multiple is based on an aggregation level ratio between the highest aggregation level and the lower aggregation level.

24. The apparatus of claim 21, wherein the integer multiple is based on an aggregation level ratio between the highest aggregation level and the lower aggregation level.

25. The apparatus of claim 19, wherein the set of lower aggregation level decoding candidates are randomly selected from the plurality of potential decoding candidates based on at least one of a user equipment identifier, a cell identifier, time information, and a configured random number.

26. A non-transitory computer-readable medium storing computer executable code for wireless communication at a user equipment, the code when executed by a processor cause the processor to:
- determine a set of decoding candidates of a lower aggregation level for a downlink control channel based on a random selection from a plurality of potential decoding candidates, wherein the plurality of potential decoding candidates are defined from a second set of decoding candidates of a higher aggregation level, wherein the second set of decoding candidates of the higher aggregation level comprises one or more augmented decoding candidates when a first number of decoding candidates comprised in the lower aggregation level is not within an integer multiple of a second number of decoding candidates comprised in the higher aggregation level; and
- attempt to decode the downlink control channel based on determined sets of decoding candidates of different aggregation levels.

27. The non-transitory computer-readable medium of claim 26, wherein the downlink control channel comprises a physical downlink control channel (PDCCH).

28. The non-transitory computer-readable medium of claim 26, wherein the higher aggregation level comprises a highest aggregation level.

29. The non-transitory computer-readable medium of claim 28, wherein resource elements in a decoding candidate in the highest aggregation level are uniformly split into integer sets of resource elements, each supporting a potential decoding candidate for the lower aggregation level, wherein the integer is based on an aggregation level ratio between the highest aggregation level and the lower aggregation level.

30. The non-transitory computer-readable medium of claim 28, wherein the first number of decoding candidates comprised in the lower aggregation level is within an integer multiple of a second number of decoding candidates comprised in the highest aggregation level, wherein the integer multiple is based on an aggregation level ratio between the highest aggregation level and the lower aggregation level.

* * * * *